United States Patent [19]

Forrest

[11] 4,357,130
[45] Nov. 2, 1982

[54] WIND COLLECTION APPARATUS

[76] Inventor: William J. Forrest, 3400 NW. Expressway, Oklahoma City, Okla. 73112

[21] Appl. No.: 131,663

[22] Filed: Mar. 19, 1980

Related U.S. Application Data

[63] Continuation-in-part of Ser. No. 835,184, Sep. 21, 1977, Pat. No. 4,204,795.

[51] Int. Cl.³ .............................................. F03D 3/06
[52] U.S. Cl. ........................... 416/197 A; 416/196 A
[58] Field of Search .......... 416/197 A, 196 A, 240 A, 416/194 A; 415/2 R

[56] References Cited

U.S. PATENT DOCUMENTS

| 440,266 | 11/1890 | Meredith | 416/196 A |
|---|---|---|---|
| 1,001,291 | 8/1911 | McKenzie | 416/196 A |
| 1,055,858 | 3/1913 | Bennett | 415/2 R X |
| 1,105,750 | 8/1914 | Browne | 416/197 A X |
| 1,120,930 | 12/1914 | Goss et al. | 416/196 A X |
| 1,300,499 | 4/1919 | Slagel | 417/197 A X |
| 1,578,835 | 3/1926 | Kothe | 416/197 A X |
| 1,790,175 | 1/1931 | Spencer | 415/2 R X |
| 1,798,211 | 3/1931 | Law | 415/2 R X |
| 1,948,458 | 2/1934 | De La Cierva | 416/196 A X |
| 2,436,747 | 2/1948 | DuBrie | 416/197 A X |
| 4,118,637 | 10/1978 | Tackett | 416/197 A X |
| 4,142,823 | 3/1979 | Nickell | 415/2 R |
| 4,204,795 | 5/1980 | Forrest | 415/2 R |
| 4,204,796 | 5/1980 | Pack | 416/197 A X |

FOREIGN PATENT DOCUMENTS

| 56361 | 1/1958 | Belgium | 416/240 A |
|---|---|---|---|
| 423575 | 1/1926 | Fed. Rep. of Germany | 415/2 R |
| 1021619 | 2/1953 | France | 416/197 A |
| 2289761 | 5/1976 | France | 416/197 A |
| 344055 | 10/1936 | Italy | 415/2 R |
| 445080 | 2/1949 | Italy | 416/197 A |
| 19401 | of 1891 | United Kingdom | 416/196 A |
| 263722 | 1/1927 | United Kingdom | 416/197 A |

Primary Examiner—Everette A. Powell, Jr.
Attorney, Agent, or Firm—Dunlap & Codding

[57] ABSTRACT

An improved wind collecting apparatus utilized for transforming wind energy to rotary motion. The rotary motion then can be utilized for driving an electric generator, for example. The apparatus generally comprises four semi-cylindrically shaped wind collecting blades connected to a shaft which is mounted for rotation about an axis of rotation and includes blade and cable support systems for reducing the effect of various destructive forces and for providing structural integrity, the apparatus also including flexibly connected joints to provide some flexibility in the supporting structure while maintaining the required structural integrity.

15 Claims, 8 Drawing Figures

WIND COLLECTION APPARATUS

CROSS-REFERENCE TO RELATED APPLICATIONS

This application is a continuation-in-part of the co-pending patent application entitled "WIND COLLECTING METHOD AND APPARATUS", Ser. No. 835,184, filed Sept. 21, 1977, now U.S. Pat. No. 4,204,795.

BACKGROUND OF THE INVENTION

Field of the Invention

The present invention relates generally to the field of transforming energy into rotary motion, and, more particularly, but not by way of limitation, to the field of wind collecting apparatus for transforming wind energy to rotary motion provided at an output shaft.

DESCRIPTION OF THE PREFERRED EMBODIMENT

Figure 1:
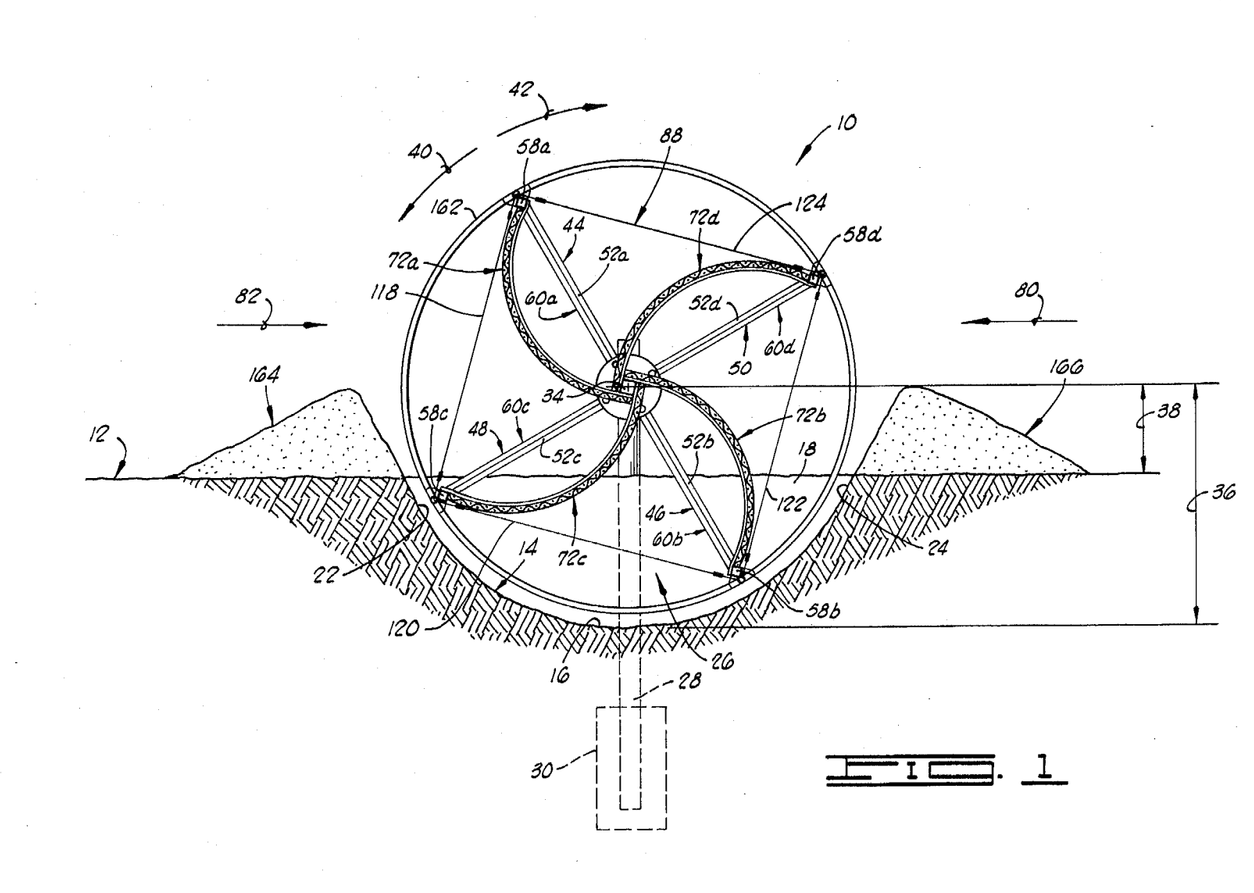
FIG. 1 is a partial cross-sectional, end elevational view of a wind collecting apparatus constructed in accordance with the present invention.
Figure 2:
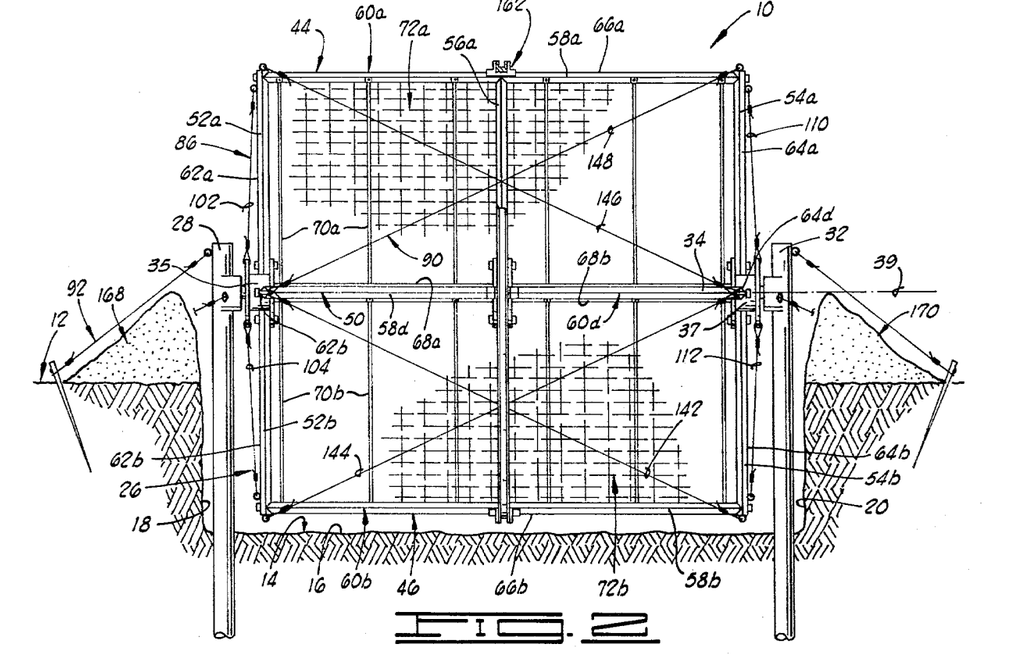
FIG. 2 is a partial cross-sectional, front elevational view of the wind collecting apparatus shown in FIG. 1.

Referring to the drawings in general, and to FIGS. 1 and 2 in particular, shown therein and designated via the general reference numeral 10 is a wind collecting apparatus which is constructed in accordance with the present invention. The apparatus 10 is generally utilized to transform energy contained in wind to rotational motion, and a wind collecting apparatus of this type was disclosed in the Applicant's co-pending patent application entitled "WIND COLLECTING METHOD AND APPARATUS", Ser. No. 835,184, filed Sept. 21, 1977, now U.S. Pat. No. 4,204,795, this disclosure being specifically incorporated herein by reference. This rotational motion so produced can then be coupled to an appparatus such as an electric generator (not shown) to produce electrical energy, for example. It should be noted that it is contemplated within the scope of the present invention that the wind collecting apparatus 10 could be constructed in a greatly enlarged and more sophisticated form and be incorporated into an extensive power network.

As shown in FIGS. 1 and 2, the wind collecting apparatus 10 is supported on the earth's surface 12. A cavity 14 is formed in the earth's surface 12 extending a distance into the earth's surface 12 terminating with a lowermost cavity surface 16. The cavity 14 has opposite first and second ends 18 and 20, respectively, a first side 22 and a second side 24. The cavity 14 forms cavity walls in the earth and provides a space 26 of lower pressure relative to the pressure of the wind generally at the earth's surface 12.

Figure 3:
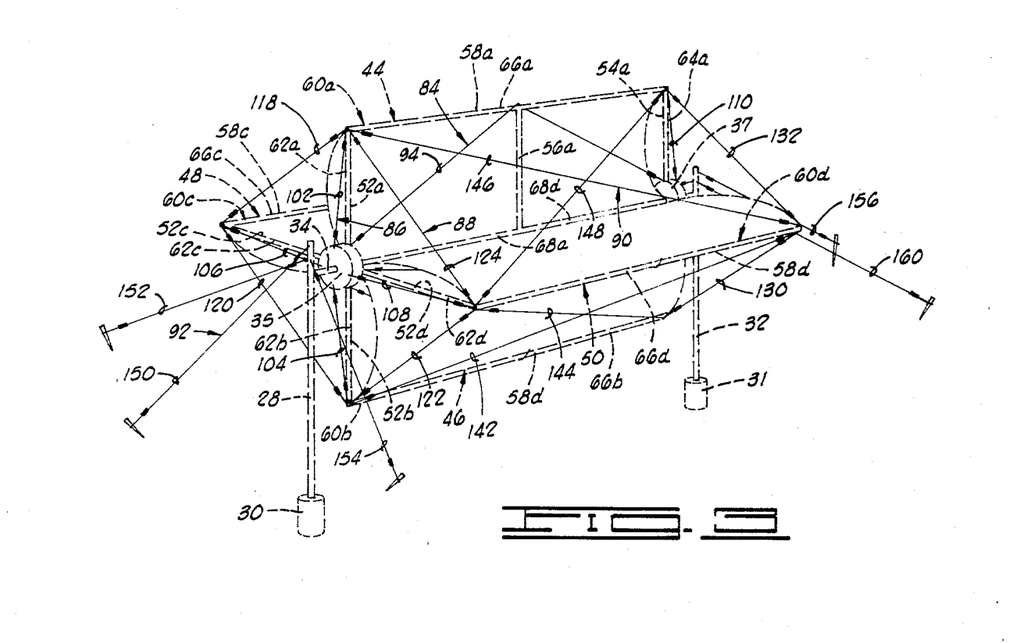
FIG. 3 is a diagrammatic view showing a portion of the cable support system of the wind collecting apparatus of FIG. 1, the other elements being shown in dashed lines.

A first support post 28 is positioned within the cavity 14, near the first end 18 and midway between the opposite sides 22 and 24. One end of the first support post 28 is inserted a distance into the earth and, in this position, the first support post 28 is securely anchored in the earth via a concrete anchor 30, as shown in FIGS. 1 and 3. The first support post 28 extends a distance in a generally vertical direction to a position generally above the earth's surface 12.

A second support post 32 is positioned within the cavity 14, near the second end 20 and midway between the opposite sides 22 and 24. One end of the second support post 32 is inserted a distance into the earth and, in this position, the second support post 32 is securely anchored in the earth via a concrete anchor 31, as shown in FIG. 3. The second support post 32 extends a distance in a generally vertical direction to a position generally above the earth's surface 12, and the second support post 32 is spaced a distance from the first support post 28.

A shaft 34 is disposed between the first and second support posts 28 and 32. The shaft 34 extends generally between the first and the second ends 18 and 20 of the cavity 14 and the shaft 34 extends a distance generally parallel with respect to the earth's surface 12. The shaft 34 is spaced a distance 36 from the lowermost cavity surface 16 and the shaft 34 is a distance 38 from the earth's surface 12.

A first rim bearing 35 is connected to one end of the shaft 34 and a second rim bearing 37 is connected to the opposite end of the shaft 34, the rim bearings 35 and 37 each rotating with the shaft 34 during the operation of the wind collecting apparatus 10. One end of the shaft 34 is journally connected to the first support post 28 via the rim bearing 35 and the opposite end of the shaft 34 is journally connected to the second support post 32 via the rim bearing 37. Thus, the first and the second support posts 28 and 30 cooperate to support the shaft 34 for rotation about an axis of rotation 39 (shown in FIG. 2) generally defined via a centerline axially extending through the shaft 34, the shaft 34 being supported for rotation in a first direction of rotation 40 and in a second direction of rotation 42. In one embodiment, it is contemplated that the shaft 34 will extend in a direction generally transverse with respect to the direction of the prevailing winds at the location of the wind collecting apparatus 10.

The wind collecting apparatus 10 also includes: a first blade support assembly 44, a second blade support assembly 46, a third blade support assembly 48 and a third blade support assembly 50. The blade support assemblies 44, 46, 48 and 50 comprising a blade support system. As shown more clearly in FIGS. 1, 2, 3, 4 and 6, the blade support assemblies 44, 46, 48 and 50 are identical in construction. Each blade support assembly 44, 46, 48 and 50 includes a first end post 52, having opposite ends, with one end connected with bolts to the shaft 34, the first end post 52 extending a distance radially from the shaft 34 terminating with the opposite end thereof; a second end post 54, having opposite ends, with one end connected with bolts to the shaft 34 at a position generally midway between the opposite ends of the shaft 34, the second end post 54 extending a distance radially from the shaft 34 terminating with the opposite end thereof; a medial post 56, having opposite ends, with one end connected with bolts to the shaft 34, the medial post 56 extending a distance radially from the shaft 34 terminating with the opposite end; and a side post 58, having opposite ends, with one end connected with bolts to the first end post 52 generally near the end of the first end post 52 opposite the end thereof which is connected to the shaft 34 and the opposite end of the side post 58 is connected with bolts to the second end post 54 generally near the end of the second end post 54 opposite the end thereof which is connected to the shaft 34. The end of each medial post 56, opposite the end thereof which is connected to the shaft 34, is connected with bolts to the respective side post 58, generally at a position midway between the opposite ends of the medial post 56, each medial post 56 being disposed generally midway between the respective first and second end posts 52 and 54. Since the blade support assemblies 44, 46, 48 and 50 are identical in construction, the corresponding elements of the assemblies 44, 46, 48 and 50 are designated with like numerals in the drawings with the designation "a" being added to the numeral designation of the elements of the first blade support assembly 44, the designation "b" being added to the numeral designation of the elements of the second blade support assembly 46, the designation "c" being added to the numeral designation of the elements of the third blade support assembly 48 and the designation "d" being added to the numeral designation of the elements of the fourth blade support assembly 50.

The posts 52, 54, 56 and 58 of each of the assemblies 44, 46, 48 and 50 cooperate with the shaft 34 to form a blade frame 60, the four separate blade frames 60a, 60b, 60c and 60d being shown in the drawings. Each blade frame 60 is generally rectangularly shaped and each blade frame 60 has opposite first and second ends 62 and 64 and opposite first and second sides 66 and 68, the first end post 52 of each blade frame 60 forming the first end 62, the second end post 54 of each blade frame 60 forming the second end 64, the side post 58 of each blade frame 60 forming the first side 66 and the shaft 34 forming the second side 68 of each blade frame 60.

The blade frame 60a sometimes is referred to herein as "the first blade frame", the blade frame 60b sometimes is referred to herein as "the second blade frame", the blade frame 60c sometimes is referred to herein as "the third blade frame", and the blade frame 60d sometimes is referred to herein as "the fourth blade frame". The second blade frame 60c is disposed about one hundred eighty degrees from the first blade frame 60a, and the second blade frame 60b extends from the shaft 34 in an opposite direction with respect to first blade frame 60a. The third blade frame 60c is disposed about ninety degrees from the first blade frame 60a and about ninety degrees from the second blade frame 60c. The fourth blade frame 60d is disposed about one hundred eighty degrees from the third blade frame 60c and extends from the shaft 34 in a generally opposite direction with respect to the third blade frame 60c.

Figure 4:
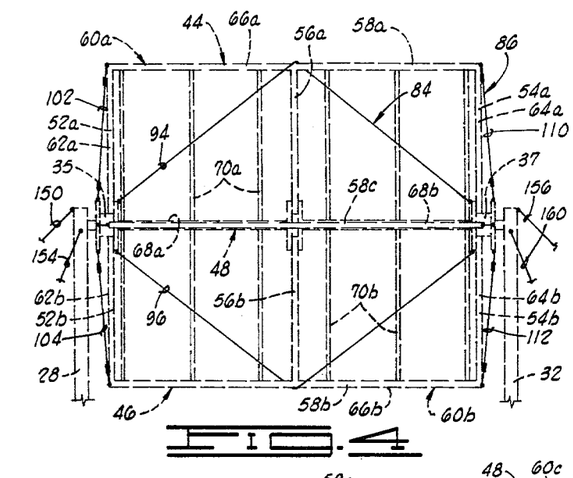
FIG. 4 is another diagrammatic view showing a portion of the cable support system of the wind collecting apparatus of FIG. 1, the other elements being shown in dashed lines.
Figure 6:
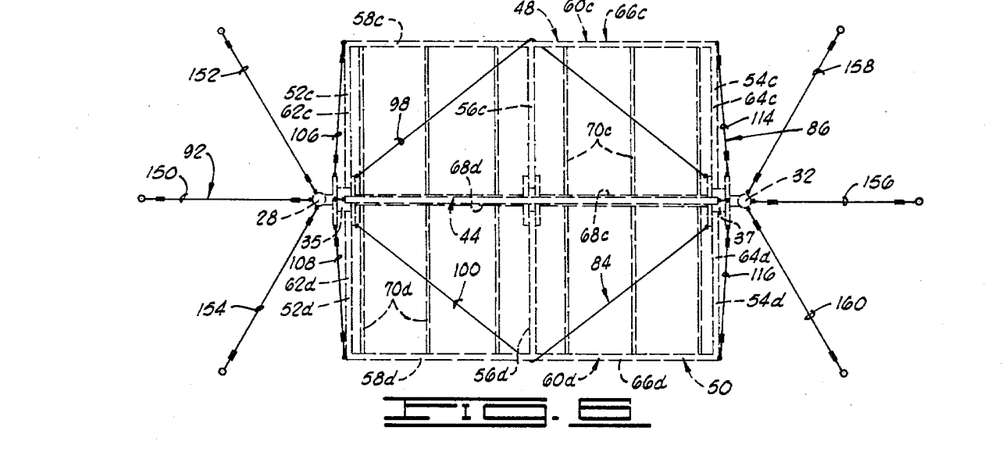
FIG. 6 is still another diagrammatic view showing a portion of the cable support system of the wind collecting apparatus of FIG. 1, the other elements being shown in dashed lines.

Each of the blade support assemblies 44, 46, 48 and 50 includes a plurality of blade rods 70, the blade rods 70a, 70b, 70c and 70d being shown in FIGS. 2, 4 and 6 and only some of the blade rods 70a, 70b, 70c and 70d being specifically designated by a reference numeral in the drawings. Each of the blade rods 70 has opposite ends with one end of each of the blade rods 70 being connected to the shaft 34 and the opposite end of each of the blade rods 70 being connected to the respective side posts 58. Each of the blade rods 70 extends radially from the shaft 34 and forms an arc extending between the shaft 34 and the respective side post 58.

The blade support assemblies 44, 46, 48 and 50 are spaced circumferentially about the shaft 34. Each blade support assembly 44, 46, 48 and 50 is spaced about ninety degrees (90°) from the two adjacent blade support assemblies and about one hundred eighty degrees (180°) from the remaining blade support assembly.

Figure 5:
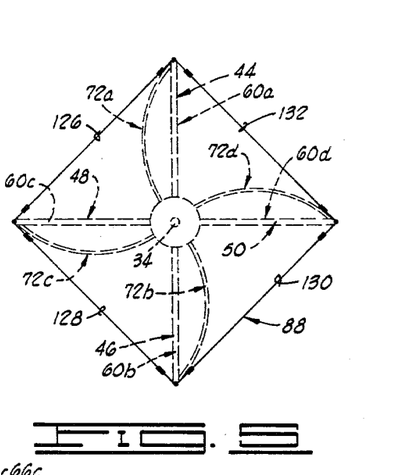
FIG. 5 is yet another diagrammatic view showing a portion of the cable support system of the wind collecting apparatus of FIG. 1, the other of the elements being shown in dashed lines.

As shown more clearly in FIGS. 1, 2 and 5, the wind collecting apparatus 10 includes four (4) blades 72, the four (4) blades being designated in the drawings by the reference numerals 72a, 72b, 72c and 72d since each of the blades 72 is associated with one of the blade support assemblies 44, 46, 48 and 50. Each blade 72 comprises a base, a first mesh screen and a second mesh screen. The first mesh screen is disposed on one side of the base and the second mesh screen is disposed on the opposite side of the base. The first and the second mesh screens of each blade 72 each comprise a plurality of spaced apart wires extending in one direction and a plurality of wires extending in a transverse direction with respect to the first mentioned plurality of wires. The first mentioned plurality of wires of each blade 72 are connected to adjacent portions of the last mentioned plurality of wires to form a meshlike screen. The construction of blades like the blades 72 is described in detail in the Applicant's co-pending application, mentioned before, and thus a detailed description of the construction and the operation of the blades 72 is not required herein.

One side of each blade 72 is connected to the shaft 34 and each blade 72 extends radially from the shaft 34 terminating with the opposite side which is connected to the respective side post 58, each blade 72 extending generally between the shaft 34 and the respective one of the side posts 58. Further, each blade 72 extends along the shaft 34 generally between the opposite ends of the shaft 34. Each of the blades 72 is connected to each of the blade rods 70 associated with the respective blade support assembly 44, 46, 48 and 50, the blade 72a being connected to the blade rods 70a, the blade 72b being connected to the blade rods 70b, the blade 72c being connected to the blade rods 70c and the blade 72d being connected to the blade rods 70d. Thus, each blade 72 extends between the first and second ends 62 and 64 of the respective blade frame 60 and between the first and second sides 66 and 68 of the respective blade frame 60, each blade 72 extending in an arc between the first and second sides 66 and 68 of the respective blade frame 60.

The material forming the base of each of the blades 72 is non-permeable to air and thus any wind blowing or moving in a first direction 80 will impact against the blades 72, thereby resulting in a force being applied against the non-permeable material forming the base causing the rotation of the shaft 34 in the first direction of rotation 40. In a similar manner, any wind blowing or moving in a second direction 82 will impact against the blades 72, thereby resulting in a force being applied against the non-permeable material forming the base causing the rotation of the shaft 34 in the second direction of rotation 42. When the wind collecting apparatus 10 is rotating in the first or the second directions of rotation 40 and 42 caused via wind blowing against the blades 72, the blades 72 substantially sweeps a generally cylindrically shaped space of rotation. The cavity 14 substantially defines a lower portion of this space of rotation.

The wind collecting apparatus 10 includes: a base transverse cable assembly 84; a base end cable assembly 86, a frame end cable assembly 88, a frame transverse cable assembly 90 and a support post cable assembly 92. The present invention contemplates a wind collecting apparatus which is relatively long and it has been discovered that, if the supporting structure is rigidly connected in a manner which does not allow for some flexibility, the apparatus will be substantially destroyed or damaged during the operation. The assemblies 84, 86, 88, 90 and 92 have been found to cooperate to provide the required structural strength and integrity, while still permitting some flexible movement of the various interconnected members in a manner which substantially reduces the possibility of destruction or damage during the operation. The assemblies 88, 90, 92 and 94 cooperate to define a cable support system.

As shown more clearly in FIGS. 3, 4 and 6, the base transverse cable assembly 84 includes four (4) base transverse cables 94, 96, 98 and 100, each base transverse cable 94, 96, 98 and 100 having opposite ends. One end of the base transverse cable 94 is connected to the shaft 34, generally near one end of the shaft 34 (the base transverse cable 94 more particularly being connected to the first rim bearing 35), and the opposite end of the base transverse cable 94 is connected to the shaft 34, generally near the opposite end of the shaft 34 (this end of the base transverse cable 94 more particularly being connected to the second rim bearing 37). The base transverse cable 94 extends from one end of the shaft 34 generally toward the first side 66a of the first blade frame 60a and the base transverse cable 94 is connected to the first blade frame 60a generally near the first side 66a and generally between the first and the second ends 62a and 64a of the first blade frame 60a, the cable 94 more particularly being connected to the side post 58a at a position generally midway between the opposite ends of the side posts 58a. The base transverse cable 94 extends from the second side post 58a toward the opposite end of the shaft 34. One end of the base transverse cable 96 is connected to the shaft 34 generally near one end of the shaft 34 and generally near the first end 62b of the second blade frame 60b (the base transverse cable 96 more particularly being connected to the first rim bearing 35), and the opposite end of the base transverse cable 96 is connected to the shaft 34 generally near the opposite end of the shaft 34 and generally near the second end 64b of the second blade frame 60b (this end of the base transverse cable 96 more particularly being connected to the second rim bearing 37). The base transverse cable 96 extends from one end of the shaft 34 outwardly toward the first side 66b of the second blade frame 60b and the base transverse cable 96 is connected to the second blade frame 60b generally near the first side 66b and generally between the first and the second ends 62b and 64b of the second blade frame 60b, the base transverse cable 96 more particularly being connected to the side post 58b at a position generally midway between the opposite ends of the side post 58b. The base transverse cable 96 extends from the second blade frame 60b generally toward the opposite end of the shaft 34. One end of the base transverse cable 98 is connected to the shaft 34 generally near one end of the shaft 34 and generally near the first end 62c of the third blade frame 60c (the base transverse cable 98 more particularly being connected to the first rim bearing 35), and the opposite end of the base transverse cable 98 is connected to the shaft 34 generally near the opposite end of the shaft 34 and generally near the second end 64c of the third blade frame 60c (this end of the base transverse cable 98 more particularly being connected to the second rim bearing 37). The base transverse cable 98 extends from one end of the shaft outwardly toward the first side 66c of the third blade frame 60c and the base transverse cable 98 is connected to the third blade frame 60c generally near the first side 66c and generally midway between the first and the second ends 62c and 64c of the third blade frame 60c, the base transverse cable 98 more particularly being connected to the side post 58c at a position generally midway between the opposite ends of the second side post 58c. The base transverse cable 98 extends from the third blade frame 60c toward the opposite end of the shaft 34. One end of the base transverse cable 100 is connected to the shaft 34 generally near one end of the shaft 34 and generally near the first end 62d of the fourth blade frame 60d (the base transverse cable 100 more particularly being connected to the first rim bearing 35), and the opposite end of the base transverse cable 100 is connected to the shaft 34 generally near the opposite end of the shaft 34 and generally near the second end 64d of the fourth blade frame 60d (this end of the base transverse cable 100 more particularly being connected to the second rim bearing 37). The base transverse cable 100 extends from one end of the shaft 34 outwardly generally toward the first side 66d of the fourth blade frame 60d and the base transverse cable 100 is connected to the fourth blade frame 60d generally near the first side 66d and generally midway between the first and the second ends 62d and 64d of the fourth blade frame 60d, the base transverse cable 100 more particularly being connected to the second side post 58d at a position generally midway between the opposite ends of the side post 58d. The base transverse cable 100 extends from the fourth blade frame 60d generally toward the opposite end of the shaft 34. It should be noted that the base transverse cables 94, 96, 98 and 100 are connected to the rim bearings 35 and 37 merely as a conenient method of connecting the base transverse cables 94, 96, 98 and 100 to the shaft 34 and thus the base transverse cables 94, 96, 98 and 100 sometimes are referred to herein as being connected to the shaft 34 since the base transverse cable 94, 96, 98 and 100 actually are connected to the shaft 34 via the rim bearings 35 and 37.

As shown more clearly in FIGS. 2, 3, 4 and 6, the base end cable assembly 86 includes eight (8) base end cables 102, 104, 106, 108, 110, 112, 114 and 116, and each of the base end cables 102-116 has opposite ends. One end of the base end cable 102 is connected to one end of the shaft 34 generally near the first end 62a of the first blade frame 60a (the base end cable 102 being more particularly connected to the first rim bearing 35) and the opposite end of the base end cable 102 is connected to the first blade frame 60a generally near the first end 62a and generally near the first side 66a of the first blade frame 60a, the base end cable 102 more particularly being connected to the first end post 52a generally near one end of the first end post 52a opposite the end of the first end post 52a which is connected to the shaft 34. One end of the base end cable 104 is connected to one end of the shaft 34 generally near the first end 62b of the second blade frame 60b (the base end cable 104 more particularly being connected to the first rim bearing 35) and the opposite end of the base end cable 104 is connected to the second blade frame 60b generally near the first end 62b and generally near the first side 66b of the second blade frame 60b, the base end cable 104 more particularly being connected to one end of the first end post 52b opposite the end of the first end post 52b which is connected to the shaft 34. One end of the base end cable 106 is connected to one end of the shaft 34 generally near the first end 62c of the blade frame 60c (the base end cable 106 more particularly being connected to the first rim bearing 35) and the opposite end of the base end cable 106 is connected to the third blade frame 60c generally near the first end 62c and generally near the first side 66c of the third blade frame 60c, the base end cable 106 more particularly being connected to one end of the first end post 52c opposite the end of the first end post 52c which is connected to the shaft 34. One end of the base end cable 108 is connected to the shaft generally near the first end 62d of the fourth blade frame 60d (the base end cable 108 more particularly being connected to the first rim bearing 35) and the opposite end of the base cable 108 is connected to the fourth blade frame 60d generally near the first end 62d and generally near the first side 66d of the fourth blade frame 60d, the base end cable 108 more particularly being connected to one end of the first post 52d generally opposite the end of the first post 52d which is connected to the shaft 34. One end of the base end cable 110 is connected to the shaft 34 generally near the second end 64a of the first blade frame 60a (the base end cable 110 more particularly being connected to the second rim bearing 37) and the opposite end of the base end cable 110 is connected to the first blade frame 60a generally near the second end 64a and generally near the first side 66a of the first blade frame 60a, the base end cable 110 more particularly being connected to one end of the second end post 54a generally opposite the end of the second end post 54a which is connected to the shaft 34. One end of the base end cable 112 is connected to the shaft 34 generally near the second end 64b of the second blade frame 60b (the base end cable 112 more particularly being connected to the second rim bearing 37) and the opposite end of the base end cable 112 is connected to the second blade frame 60b generally near the second end 64b and generally near the first side 66b of the second blade frame 60b, the base end cable 112 more particularly being connected to one end of the second post 54b generally opposite the end of the second post 54b which is connected to the shaft 34. One end of the base cable 114 is connected to one end of the shaft 34 generally near the second end 64c of the third blade frame 60c (the base end cable 114 more particularly being connected to the second rim bearing 37) and the opposite end of the base end cable 114 is connected to the third blade frame 60c generally near the second end 64c and generally near the first side 66c of the third blade frame 60c, the base end cable 114 more particularly being connected to the end of the second end post 54c opposite the end of the second end post 54c which is connected to the shaft 34. One end of the base end cable 116 is connected to one end of the shaft 34 generally near the second end 64d of the fourth blade frame 60d (the base end cable 116 more particularly being connected to the second rim bearing 37) and the opposite end of the base end cable 116 is connected to the fourth blade frame 60d generally near the second end 64d and generally near the first side 66d of the fourth blade frame 60d, the base end cable 116 more particularly being connected to one end of the second end post 54d, opposite the end of the second end post 54d which is connected to the shaft 34. The base end cables 102–116 sometimes are referred to herein as being connected to the shaft 34 rather than the rim bearings 35 and 37 for reasons like that described before with respect to the base transverse cables 94–100. The base end cables 102–116 cooperate to reduce the weight of the blades 72 and the supporting blade structures on the connections between the blade frames 60 and the shaft 34 or rim bearings 35 and 37.

As shown more clearly in FIGS. 1, 3 and 5, the frame end cable assembly 88 includes eight (8) frame end cables 118, 120, 122, 124, 126, 128, 130 and 132 and each of the frame end cables 118–132 has opposite ends. One end of the frame end cable 118 is connected to the first blade frame 60a generally near the first end 62a and generally near the first side 66a of the first blade frame 60a (the cable 118 more particularly being connected to the end of the first end post 52a opposite the end of the first end post 52a which is connected to the shaft 34) and the opposite end of the frame end cable 118 is connected to the third blade frame 60c generally near the first end 62c and generally near the first side 66c of the third blade frame 60c (the end of the cable 118 more particularly being connected to the end of the first end post 52c opposite the end of the first end post 52c which is connected to the shaft 34). One end of the frame end cable 120 is connected to the third blade frame 60c generally near the first end 62c and generally near the first side 66c of the third blade frame 60c (the frame end cable 120 more particularly being connected to the end of the first end post 52c opposite the end of the first end post 52c which is connected to the shaft 34) and the opposite end of the frame end cable 120 is connected to the second blade frame 60b generally near the first end 62b and generally near the first side 66b of the second blade frame 60b (the frame end cable 120 more particularly being connected to the end of the first end post 52b opposite the end of the first end post 52b which is connected to the shaft 34). One end of the frame end cable 122 is connected to the second blade frame 60b generally near the first end 62b and generally near the first side 66b of the second blade frame 60b (the cable 122 more particularly being connected to the end of the first end post 52b opposite the end of the first end post 52b which is connected to the shaft 34) and the opposite end of the frame end cable 122 is connected to the fourth blade frame 60d generally near the first end 62d and generally near the first side 66d of the fourth blade frame 60d (the frame end cable 122 more particularly being connected to the end of the first end post 52d opposite the end of the first end post 52d which is connected to the shaft 34). One end of the frame end cable 124 is connected to the fourth blade frame 60d generally near the first end 62d and generally near the first side 66d of the fourth blade frame 60d (the frame end cable 124 more particularly being connected to the end of the first end post 52d opposite the end of the first end post 52d which is connected to the shaft 34) and the opposite end of the frame end cable 124 is connected to the first blade frame 60a generally near the first end 62a and generally near the first side 66a of the first blade frame 60a (the frame end cable 124 more particularly being connected to the end of the first end post 52a opposite the end of the first end post 52a which is connected to the shaft 34). One end of the frame end cable 126 is connected to the first blade frame 60a generally near the second end 64a and generally near the first side 66a of the first blade frame 60a (the frame end cable 126 more particularly being connected to the end of the second end post 54a opposite the end of the second end post 54a which is connected to the shaft 34) and the opposite end of the frame end cable 126 is connected to the third blade frame 60c generally near the second end 64c and generally near the first side 66c of the third blade frame 60c (the frame end cable 126 more particularly being connected to the end of the second end post 54c opposite the end of the second end post 54c which is connected to the shaft 34). One end of the frame end cable 128 is connected to the third blade frame 60c generally near the second end 64c and generally near the first side 66c of the third blade frame 60c (the frame end cable 128 more particularly being connected to the end of the second end post 54c opposite the end of the second end post 54c which is connected to the shaft 34) and the opposite end of the frame end cable 128 is connected to the second blade frame 60b generally near the second end 64b and generally near the first side 66b of the second blade frame 60b (the frame end cable 128 more particularly being connected to one end of the second end post 54b opposite the end of the second end post 54b which is connected to the shaft 34). One end of the frame end cable 130 is connected to the second blade frame 60b generally near the second end 64b and generally near the first side 66b of the second blade frame 60b (the frame end cable 130 more particularly connected to one end of the second end post 54b opposite the end of the second end post 54b which is connected to the shaft 34) and the opposite end of the frame end cable 130 is connected to the fourth blade frame 60d generally near the second end 64d and generally near the first side 66d of the fourth blade frame 60d (the frame end cable 130 more particularly being connected to the end of the second end post 54d opposite the end of the second end post 54d which is connected to the shaft 34). One end of the frame end cable 132 is connected to the fourth blade frame 60d generally near the second end 64d and generally near the first side 66d of the fourth blade frame 60d (the frame end cable 132 more particularly being connected to one end of the second end post 54d opposite the end of the second end post 54d which is connected to the shaft 34) and the opposite end of the frame end cable 132 is connected to the first blade frame 60a generally near the second end 64a and generally near the first side 66a of the first blade frame 60a (the frame end cable 132 more particularly being connected to one end of the second end post 54a opposite the end of the second end post 54a which is connected to the shaft 34). The frame end cables 118-132 tend to divide the pressure or forces among the four blade support assemblies 44, 46, 48 and 50 regardless of which blade 72 actually is being acted upon by the wind.

Figure 7:
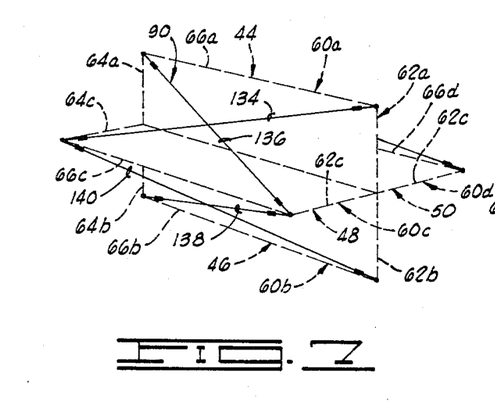
FIG. 7 is another diagrammatic view showing portions of the cable support system of the wind collecting apparatus of FIG. 1, the other elements being shown in dashed lines.
Figure 8:
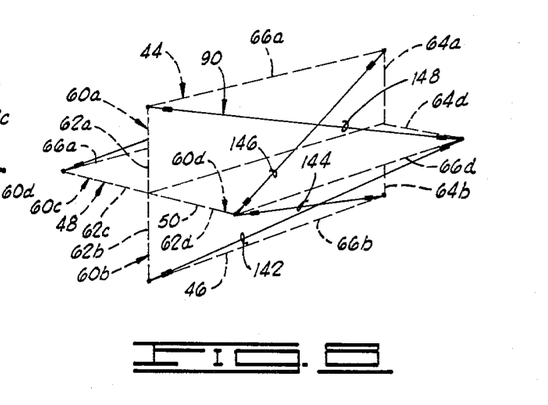
FIG. 8 is one other diagrammatic view showing portions of the cable support system of the wind collecting apparatus of FIG. 1, the other elements being shown in dashed lines.

As shown more clearly in FIGS. 2, 7 and 8, the frame transverse cable assembly 90 includes eight (8) frame transverse cables 134, 136, 138, 140, 142, 144, 146 and 148, and each of the frame transverse cables 134-148 has opposite ends. One end of the frame transverse cable 134 is connected to the first blade frame 60a generally near the first end 62a and generally near the first side 66a of the first blade frame 60a (the frame transverse cable 134 more particularly being connected to the end of the first end post 52a opposite the end of the first end post 52a which is connected to the shaft 34) and the opposite end of the frame transverse cable 134 is connected to the third blade frame 60c generally near the second end 64c and generally near the first side 66c of the third blade frame 60c (the frame transverse cable 134 more particularly being connected to the end of the second end post 54c, opposite the end of the second end post 54c which is connected to the shaft 34). One end of the frame transverse cable 136 is connected to the first blade frame 60a generally near the second end 64a and generally near the first side 66a of the first blade frame 60a (the frame transverse cable 136 more particularly being connected to the end of the second end post 54a opposite the end of the second end post 54a which is connected to the shaft 34) and the opposite end of the frame transverse cable 136 is connected to the third blade frame 60c generally near the first end 62c and generally near the first side 66c of the third blade frame 60c (the frame transverse cable 136 more particularly being connected to the end of the first end post 52c opposite the end of the first end post 52c which is connected to the shaft 34). One end of the frame transverse cable 138 is connected to the third blade frame 60c generally near the first end 62c and generally near the first side 66c of the third blade frame 60c (the frame transverse cable 138 more particularly being connected to one end of the first end post 52c opposite the end of the first end post 52c which is connected to the shaft 34) and the opposite end of the frame transverse cable 138 is connected to the second blade frame 60b generally near the second end 64b and generally near the first side 66b of the second blade frame 60b (the frame transverse cable 138 more particularly being connected to the end of the second end post 54b opposite the end of the second end post 54b which is connected to the shaft 34). One end of the frame transverse cable 140 is connected to the third blade frame 60c generally near the second end 64c and generally near the first side 66c of the third blade frame 60c (the frame transverse cable 140 more particularly being connected to the end of the second end post 54c opposite the end of the second end post 54c which is connected to the shaft 34) and the opposite end of the frame transverse cable 140 is connected to the second blade frame 60b generally near the first end 62b and generally near the first side 66b of the second blade frame 60b (the frame transverse cable 140 more particularly being connected to the end of the first end post 52b opposite the end of the first end post 52b which is connected to the shaft 34). One end of the frame transverse cable 142 is connected to the second blade frame 60b generally near the first end 62b and generally near the first side 66b of the second blade frame 60b (the frame transverse cable 142 more particularly being connected to the end of the first end post 52b opposite the end of the first end post 52b which is connected to the shaft 34) and the opposite end of the frame transverse cable 142 is connected to the fourth blade frame 60d generally near the second end 64d and generally near the first side 66d of the fourth blade frame 60d (the frame transverse cable 142 more particularly being connected to the end of the second end post 54d opposite the end of the second end post 54d which is connected to the shaft 34). One end of the frame transverse cable 144 is connected to the second blade frame 60b generally near the second end 64b and generally near the first side 66b of the second blade frame 60b (the frame transverse cable 144 more particularly being connected to the end of the second end post 54b opposite the end of the second end post 54b which is connected to the shaft 34) and the opposite end of the frame transverse cable 144 is connected to the fourth blade frame 60d generally near the first end 62d and generally near the first side 66d of the fourth blade frame 60d (the frame transverse cable 144 more particularly being connected to the end of the first end post 52d opposite the end of the first end post 52d which is connected to the shaft 34). One end of the frame transverse cable 146 is connected to the fourth blade frame 60d generally near the first end 62d and generally near the first side 66d of the fourth blade frame 60d (the frame transverse cable 146 more particularly being connected to the end of the first end post 52d opposite the end of the first end post 52d which is connected to the shaft 34) and the opposite end of the frame transverse cable 146 is connected to the first blade frame 60a generally near the second end 64a and generally near the first side 66a of the first blade frame 60a (the frame transverse cable 146 more particularly being connected to the end of the second end post 54a opposite the end of the second end post 54a which is connected to the shaft 34). One end of the frame transverse cable 148 is connected to the fourth blade frame 60d generally near the second end 64d and generally near the first side 66d (the frame transverse cable 148 more particularly being connected to the end of the second end post 54d opposite the end of the second end post 54d which is connected to the shaft 34) and the opposite end of the frame transverse cable 148 is connected to the first blade frame 60a generally near the first end 62a and generally near the first side 66a of the first blade frame 60a (the frame transverse cable 148 more particularly being connected to the end of the first end post 52a opposite the end of the first end post 52a which is connected to the shaft 34). As mentioned before, the wind collecting apparatus of the present invention particularly is adapted for applications wherein the blades 72 are relatively long and with respect to such applications, the supporting blade structures experience relatively large torsion or twisting forces during the operation. The frame transverse cables 134–148 cooperate to reduce the destructive or damaging effect of such torsion or twisting forces.

As shown more clearly in FIGS. 3 and 6, the support post cable assembly 92 includes six (6) support post cables 150, 152, 154, 156, 158 and 160 and each of the support cables 150–160 has opposite ends. One end of the support post cable 150 is connected to the end of the first support post 28 opposite the end of the first support post 28 which is anchored in the earth and the opposite end of the support post cable 150 is anchored in the earth, the support post cable 150 extending from the first support 28 toward the earth in a plane substantially co-planar with a plane extending through the first and the second support posts 28 and 32. One end of the support post cable 152 is connected to the end of the first support post 28 opposite the end of the first support post 28 which is anchored in the earth and the opposite end of the support post cable 152 is anchored in the earth, the support post cable 152 extending from the first support post 28 toward the earth in a plane which extends at an angle with respect to the planar disposition of the support post cable 150. One end of the support post cable 154 is connected to the end of the first support post 28 opposite the end of the first support post 28 which is anchored in the earth and the opposite end of the support post cable 154 is anchored in the earth, the support post cable 154 extending from the first support post 28 toward the earth in a plane which extends at an angle with respect to the planar disposition of the support post cable 150 and in a generally opposite direction with respect to the support post cable 152. One end of the support post cable 156 is connected to the end of the second support post 32 opposite the end of the second support post 32 which is anchored in the earth and the opposite end of the support post cable 156 is anchored in the earth, the support post cable 156 extending from the second support post 32 toward the earth in a plane substantially coplanar with a plane extending through the first and the second support posts 28 and 32. One end of the support post cable 158 is connected to the end of the support post 32 opposite the end of the second support post 32 which is anchored in the earth and the opposite end of the support post cable 158 is anchored in the earth, the support post cable 158 extending from the second support post 32 toward the earth in a plane which extends at an angle with respect to the planar disposition of the support post cable 156. One end of the support post cable 160 is connected to the end of the second support post 32 opposite the end of the second support post 32 which is anchored in the earth and the opposite end of the support post cable 160 is anchored in the earth, the support post cable 160 extending from the support post 32 toward the earth in a plane which extends at an angle with respect to the planar disposition of the support post cable 156 in a generally opposite direction with respect to the support post cable 158. The support post cables 150, 152 and 154 cooperate to support the first support post 28 in an upright position and the support post cables 156, 158 and 160 cooperate to support the second support post 32 in an upright position.

As shown in FIGS. 1 and 2, a circularly shaped pulley wheel 162 extends circumferentially about the blade frames 60a, 60b, 60c and 60d. A portion of the pulley wheel 162 is connected with bolts to each of the side posts 58a, 58b, 58c and 58d at a position generally midway between the opposite ends of the side posts 58. Thus, the pulley wheel 162 is connected to each of the blade frames 60 at a position generally near the first side 66 and generally midway between the first and the second ends 62 and 64 of each of the blade frames 60. In one respect, the pulley wheel 62 functions in a manner similar to the frame end cables 118–132 to tie the blade frames 60 together. In another respect, a groove is formed in the pulley wheel 162 which extends circumferentially about the pulley wheel 162. The groove is shaped to accommodate a pulley belt (not shown) for connecting or coupling the wind collecting apparatus 10 to other devices such as an electric generator (not shown) or the like, for example. Other devices such as electric generators could be connected or coupled via a pulley wheel arrangement to one end of the shaft 34, however, utilizing the larger diameter pulley wheel 162 increases the peripheral speed of the pulley wheel 162 with respect to a smaller wheel which might be connected or coupled to the end of the shaft 34 thereby increasing the power output of the wind collecting apparatus 10.

A first wind deflector 164 is positioned generally on the earth's surface 12 on one side of the shaft 34 and disposed near the first side 22 of the cavity 14. A second wind deflector 166 is positioned generally on the earth's surface 12 on one side of the shaft 34 and disposed near the second side 24 of the cavity 14. A first end deflector 168 and a second end deflector 170 (shown in FIG. 2) also are included as part of the wind deflecting apparatus 10 of the present invention. The construction and the operation of deflectors such as the deflectors 164, 166, 168 and 170 is described in detail in the Applicant's co-pending application referred to before and a detailed description of the construction and the operation of the deflectors 164, 166, 168 and 170 is not deemed necessary herein.

In an assembled operating position of the wind collecting apparatus 10, the axis of rotation 39 defined via the shaft 34 is positioned to extend in a generally transverse direction with respect to the direction of the prevailing wind in a particular location. As the prevailing wind blows in the general direction 80, some of the wind will impact against at least one of the blades 72, some of the wind moving over the wind deflecting surface of the first wind deflector 164 and being directed against at least one of the blades 72. The wind moving in the general direction 80 including the wind directed via the wind deflecting surface of the first wind deflector 164 impacts against some of the blades 72 resulting in a force being applied to blades 72 in a direction tending to cause the blades 72 to be moved in a general direction for causing the shaft 34 to be rotated in the first direction of rotation 40, a portion of the blades 72 passing through the space 26 formed via the cavity 14 during the rotation of the shaft 34 in the first direction of rotation 40. Utilizing four (4) blades 72 oriented about the shaft 34 in a manner shown in FIG. 1 assures that at least one of the blades 72 will be positioned or disposed generally above the horizontal planar disposition of the first wind deflector 164, thereby assuring at least one blade 72 always will be in a position permitting wind blowing in the general direction 80 to impact against such blade 72. The shaft 34 will be rotated in the first direction of rotation 40 when the velocity of the wind blowing in the general direction 80 is sufficient to result in a sufficient force applied to blades 72. The wind velocity (wind energy) necessary to cause the rotation of the shaft 34 is determined via the relative size of the wind collecting apparatus 10 including the relative weight of the materials utilized in constructing the wind collecting apparatus 10.

As the shaft 34 rotates in the first direction of rotation 40, as a result of wind blowing in the general direction 80, there will always be at least one blade 72 oriented or disposed generally below the horizontal planar disposition of the first and the second wind deflectors 164 and 166 assuming a wind collecting apparatus 10 constructed to have the blades 72 orientation as shown in FIG. 1. In this position of the blades 72, wind blowing in the general direction 80 normally would impact against the opposite side of the blades 72 and result in a force applied at the blade 72 in a direction tending to cause the rotation of the shaft 34 in a counter-rotational direction or, in other words, in the second direction of rotation 42. The walls formed in the earth via the cavity 14 cooperate with the first wind deflector 164 to substantially block or reduce the amount of wind blowing in the general direction 80 from impacting against the opposite sides of the blades 72, thereby maximizing the utilization of the energy of the wind blowing in the general direction 80 for causing the rotation of the shaft 34 in the first direction of rotation 40. Further, the walls formed in the earth via the cavity 14 cooperate with the first wind deflector 150 in a manner such that air which is present in the space defined via the walls in the earth formed via the cavity 14 and the first wind deflector 164 particularly the air near the lowermost cavity surface 16 tends to flow upwardly toward the earth's surface 12 as a result of a pressure differential, the air pressure near the lowermost cavity surface 16 being lower than the air pressure generally at and above the earth's surface 12. Thus, an area of lower air pressure is created generally near the lowermost cavity surface 16 and it has been found that this area of lower air pressure within the cavity 14 results in an increase in the operating efficiency of the wind collecting apparatus 10 (an increase in the rotational rate of speed of the shaft 34) because of the reduced air resistance encountered by the blades 72 passing through the cavity 14.

As the prevailing wind blows in the general direction 82, some of the wind will impact against at least one of the blades 72, some of the wind moving over the wind deflecting surface of the second wind deflector 166 and being directed against at least one of the blades 72. The wind moving in the general direction 82 including the wind directed via the wind deflecting surface of the second wind deflector 166 impacts against some of the blades 72 resulting in a force being applied to blades 72 in a direction tending to cause the blades 72 to be moved in a general direction for causing the shaft 34 to be rotated in the second direction of rotation 42, a portion of the blades 72 passing through the space 26 formed via the cavity 14 during the rotation of the shaft 34 in the second direction of rotation 42. Utilizing four (4) blades 72 oriented about the shaft 34 in a manner shown in FIG. 1 assures that at least one of the blades 72 will be positioned or disposed generally above the horizontal planar disposition of the second wind deflector 166, thereby assuring at least one blade 72 will always be in a position permitting wind blowing in the general direction 82 to impact against such blade 54. The shaft 34 will be rotated in the second direction of rotation 42 when the velocity of the wind blowing in the general direction 82 is sufficient to result in a sufficient force applied to the blades 72. The wind velocity (wind energy) necessary to cause the rotation of the shaft 34 is determined via the relative size of the wind collecting apparatus 10 including the relative weight of the materials utilized in constructing the wind collecting apparatus 10.

As the shaft 34 rotates in the second direction of rotation 42 as a result of the wind blowing in the general direction 82, there will always be at least one blade 72 oriented or disposed generally below the horizontal planar disposition of the first and the second wind deflectors 164 and 166 assuming a wind collecting apparatus 10 constructed to have blades 72 oriented as shown in FIG. 1. In this position of the blades 72, wind blowing in the general direction 82 normally would impact against the opposite side of the blades 72 resulting in a force applied at the blades 72 in a direction tending to cause the rotation of the shaft 34 in a counter-rotational direction or, in other words, in the first direction of rotation 40. The walls formed in the earth via the cavity 14 cooperate with the second wind deflector 166 to substantially reduce the amount of wind blowing in the general direction 82 from impacting against the opposite sides of the blades 72, thereby maximizing the utilization of the energy of the wind blowing in the general direction 82, for causing the rotation of the shaft 34 in the second direction of rotation 42.

It is significant to note that the various structural elements of the wind collecting apparatus 10 are interconnected with bolt type connections. If such elements are welded, it has been found that the overall resulting structure is too rigid and the various forces resulting throughout the structure during the operation result in premature damage or destruction of such welded connections. By providing bolt type connections, there is sufficient flexibility in the resulting structure to accommodate such forces while still providing the necessary structural integrity. This type of connection sometimes being referred to herein as "flexible connection means", the flexible connection means providing a semi-rigid connection between the elements while permitting some relative movement.

Changes may be made in the construction and operation of the various parts, elements and assemblies described herein without departing from the spirit and scope of the invention as described in the following claims.

What is claimed is:

1. A wind collecting apparatus comprising:
   a shaft, having opposite ends;
   a first support post disposed near one end of the shaft;
   means journally connecting one end of the shaft to the first support post;
   a second support post disposed near the end of the shaft, opposite the end of the shaft journally connected to the first support post;
   means journally connecting one end of the shaft to the second support post, the shaft extending between the first and the second support posts and being journally supported for rotation about an axis of rotation;
   at least two blade frames, each blade frame having a first end, a second end, a first side and a second side, the second side of each blade frame being connected to the shaft and each blade frame extending generally radially from the shaft terminating with the first side, the first end of each blade frame being disposed generally near one end of the shaft and the second end of each blade frame being disposed generally near the opposite end of the shaft;
   a frame transverse cable assembly having a portion connected to the first side of one of the blade frames generally near the first end and connected to the first side of one of the other blade frames generally near the second end and another portion connected to the second side of one of the blade frame generally near the second end and connected to the first side of one of the other blade frames generally near the second end;
   a frame end cable assembly having a portion connected to the first end of one of the blade frames generally near the first side and connected to the first end of one of the other blade frames generally near the first side;
   a base transverse cable assembly having a portion connected to one end portion of the shaft and extending to and being connected to the first side of each blade frame and extending and being connected to the opposite end portion of the shaft; and
   a base end cable assembly having portions connected to the shaft and to the first end of each blade frame and having portions connected to the shaft and to the second end of each blade frame.

2. The wind collecting apparatus of claim 1 defined further to include:
   a support post cable assembly having portions connected to the first support post and extending therefrom for supporting the first support post in an upright position, and having portions connected to the second support post and extending therefrom for supporting the second post in an upright position.

3. The wind collecting apparatus of claim 1 defined further to include:
   flexible connection means for connecting the blade frames to the shaft to provide a semi-rigid connection therebetween while permitting some relative movement.

4. The wind collecting apparatus of claim 1 defined further to include:
   at least two blades, one blade being connected to and supported by each blade frame, each blade generally extending between the first and the second ends and between the first and the second sides on one of the blade frames.

5. The wind collecting apparatus of claim 1 wherein the blade frames are further defined to include:
   a first blade frame having a first end, a second end, a first side and a second side, the second side being connected to the shaft and the first blade frame extending generally radially from the shaft terminating with the first side, the first end of the first blade frame being disposed generally near one end of the shaft and the second end of the first blade frame being disposed generally near the opposite end of the shaft;
   a second blade frame having a first end, a second end, a first side and a second side, the second side being connected to the shaft and the second blade frame extending generally radially from the shaft terminating with the first side, the first end of the second blade frame being disposed generally near one end of the shaft and the second end of the second blade frame being disposed generally near the opposite end of the shaft, the second blade frame being disposed about one hundred eighty degrees from the first blade frame and extending in a generally opposite direction from the shaft with respect to the first blade frame;
   a third blade frame having a first end, a second end, a first side and a second side, the second side being connected to the shaft and the third blade frame extending generally radially from the shaft terminating with the first side, the first end of the third blade frame being disposed generally near one end of the shaft and the second end of the third blade frame being disposed generally near the opposite end of the shaft, the third blade frame being disposed about ninety degrees from the first blade frame and about ninety degrees from the second blade frame; and
   a fourth blade frame having a first end, a second end, a first side and a second side, the second side being connected to the shaft and the fourth blade frame extending generally radially from the shaft terminating with the first side, the first end of the fourth blade frame being disposed generally near one end of the shaft and the second end of the fourth blade frame being disposed generally near the opposite end of the shaft, the fourth blade frame being disposed about one hundred eighty degrees from the third blade frame and extending in a generally opposite direction from the shaft with respect to the third blade frame.

6. The wind collecting apparatus of claim 5 wherein the frame transverse cable assembly is defined further to include:

a frame transverse cable having opposite ends, one end of the frame transverse cable being connected to the first blade frame generally near the first end and generally near the first side of the first blade frame and the opposite end of the frame transverse cable being connected to the third blade frame generally near the second end and generally near the first side of the third blade frame;

a frame transverse cable having opposite ends, one end of the frame transverse cable being connected to the first blade frame generally near the second end and generally near the first side of the first blade frame and the opposite end being connected to the third blade frame generally near the first end and generally near the first side of the third blade frame;

a frame transverse cable having opposite ends, one end of the frame transverse cable being connected to the second blade frame generally near the first end and generally near the first side of the second blade frame and the opposite end of the frame transverse cable being connected to the third blade frame generally near the second end and generally near the first side of the third blade frame;

a frame transverse cable having opposite ends, one end of the frame transverse cable being connected to the second blade frame generally near the second end and generally near the first side of the second blade frame and the opposite end of the frame transverse cable being connected to the third blade frame generally near the first end and generally near the first side of the third blade frame;

a frame transverse cable having opposite ends, one end of the frame transverse cable being connected to the second blade frame generally near the first end and generally near the first side of the second blade frame and the opposite end of the frame transverse cable being connected to the fourth blade frame generally near the second end and generally near the first side of the fourth blade frame;

a frame transverse cable having opposite ends, one end of the frame transverse cable being connected to the third blade frame generally near the second end and generally near the first side of the second blade frame and the opposite end of the frame transverse cable being connected to the fourth blade frame generally near the first end and generally near the first side of the fourth blade frame;

a frame transverse cable having opposite ends, one end of the frame transverse cable being connected to the fourth blade frame generally near the first end and generally near the first side of the fourth blade frame and the opposite end of the frame transverse cable being connected to the first blade frame generally near the second end and generally near the first side of the first blade frame;

a frame transverse cable having opposite ends, one end of the frame transverse cable being connected to the fourth blade frame generally near the second end and generally near the first side of the fourth blade frame and the opposite end of the frame transverse cable being connected to the first blade frame generally near the first end and generally near the first side of the first blade frame.

7. The wind collecting apparatus of claim 5 wherein the frame end cable assembly is defined further to include:

a frame end cable having opposite ends, one end of the frame end cable being connected to the first blade frame generally near the first end and generally near the first side of the first blade frame and the opposite end of the frame end cable being connected to the third blade frame generally near the first end and generally near the first side of the third blade frame;

a frame end cable having opposite ends, one end of the frame end cable being connected to the third blade frame generally near the first end and generally near the first side of the third blade frame and the opposite end of the frame end cable being connected to the second blade frame generally near the first end and generally near the first side of the second blade frame;

a frame end cable having opposite ends, one end of the frame end cable being connected to the second blade frame generally near the first end and generally near the first side of the second blade frame and the opposite end of the frame end cable being connected to the fourth blade frame generally near the first end and generally near the first side of the fourth blade frame;

a frame end cable having opposite ends, one end of the frame end cable being connected to the fourth blade frame generally near the first end and generally near the first side of the fourth blade frame and the opposite end of the frame end cable being connected to the first blade frame generally near the first end and generally near the first side of the first blade frame;

a frame end cable having opposite ends, one end of the frame end cable being connected to the first blade frame generally near the second end and generally near the first side of the first blade frame and the opposite end of the frame end cable being connected to the third blade frame generally near the second end and generally near the first side of the third blade frame;

a frame end cable having opposite ends, one end of the frame end cable being connected to the third blade frame generally near the second end and generally near the first side of the third blade frame and the opposite end of the frame end cable being connected to the second blade frame generally near the second end and generally near the first side of the second blade frame;

a frame end cable having opposite ends, one end of the frame end cable being connected to the second blade frame generally near the second end and generally near the first side of the second blade frame and the opposite end of the frame end cable being connected to the fourth blade frame generally near the second end and generally near the first side of the fourth blade frame; and a frame end cable having opposite ends, one end of the frame end cable being connected to the fourth blade frame generally near the second end and generally near the first side of the fourth blade frame and the opposite end of the frame end cable being connected to the first blade frame generally near the second end and generally near the first side of the first blade frame.

8. The wind collecting apparatus of claim 5 wherein the base transverse cable assembly is defined further to include:
- a base transverse cable having opposite ends, one end of the base transverse cable being connected to the shaft generally near one end of the shaft and generally near the first end of the first blade frame, the base transverse cable extending toward the first side of the first blade frame and being connected to the first blade frame generally near the first side and generally midway between the first and second ends of the first blade frame, the base transverse cable extending from the first blade frame toward the opposite end of the shaft and the opposite end of the base transverse cable being connected to the shaft generally near the opposite end of the shaft and generally near the second end of the first blade frame;
- a base transverse cable having opposite ends, one end of the base transverse cable being connected to the shaft generally near one end of the shaft and generally near the first end of the second blade frame, the cable extending toward the first side of the second blade frame and being connected to the second blade frame generally near the first side of the second blade frame and generally midway between the first and the second ends of the second blade frame, the cable extending from the second blade frame toward the opposite end of the shaft and the opposite end of the cable being connected to the shaft generally near the opposite end of the shaft and generally near the second end of the second blade frame;
- a base transverse cable having opposite ends, one end of the base transverse cable being connected to the shaft generally near one end of the shaft and generally near the first end of the third blade frame, the base transverse cable extending toward the first side of the third blade frame and being connected to the third blade frame generally near the first side and generally midway between the first and the second ends of the third blade frame, the base transverse cable extending from the third blade frame toward the opposite end of the shaft and the opposite end of the base transverse cable being connected to the shaft generally near the opposite end of the shaft and generally near the second end of the third blade frame; and
- a base transverse cable having opposite ends, one end of the base transverse cable being connected to the shaft generally near one end of the shaft and generally near the first end of the fourth blade frame, the cable extending from the shaft generally toward the first side of the fourth blade frame and the base transverse cable being connected to the fourth blade frame generally near the first side and generally between the first and the second ends of the fourth blade frame, the cable extending from the fourth blade frame toward the shaft and the opposite end of the base transverse cable being connected to the shaft generally near the opposite end of the shaft and generally near the second end of the fourth blade frame.

9. The wind collecting apparatus of claim 5 wherein the base end cable assembly is defined further to include:
- a base end cable having opposite ends, one end of the base end cable being connected to the shaft generally near one end of the shaft and generally near the first side of the first blade frame and the opposite end of the base end cable being connected to the first blade frame generally near the first end and generally near the first side of the first blade frame;
- a base end cable having opposite ends, one end of the base end cable being connected to the shaft generally near one end of the shaft and generally near the first end of the third blade frame and the opposite end of the base end cable being connected to the third blade frame generally near the first end and generally near the first side of the third blade frame;
- a base end cable having opposite ends, one end of the base end cable being connected to the shaft generally near one end of the shaft and generally near the first end of the second blade frame and the opposite end of the base end cable being connected to the second blade frame generally near the first end and generally near the first side of the second blade frame;
- a base end cable having opposite ends, one end of the base end cable being connected to the shaft generally near one end of the shaft and generally near the first end of the fourth blade frame and the opposite end of the base end cable being connected to the fourth blade frame generally near the first end and generally near the first side of the fourth blade frame;
- a base end cable having opposite ends, one end of the base end cable being connected to the shaft generally near one end of the shaft and generally near the second end of the first blade frame and the opposite end of the base end cable being connected to the first blade frame generally near the second end and generally near the first side of the first blade frame;
- a base end cable having opposite ends, one end of the base end cable being connected to the shaft generally near one end of the shaft and generally near the second end of the third blade frame and the opposite end of the base end cable being connected to the third blade frame generally near the second end and generally near the first side of the third blade frame;
- a base end cable having opposite ends, one end of the base end cable being connected to the shaft generally near one end of the shaft and generally near the second end of the second blade frame and the opposite end of the base end cable being connected to the second blade frame generally near the second end and generally near the first side of the second blade frame; and
- a base end cable having opposite ends, one end of the base end cable being connected to the shaft generally near one end of the shaft and generally near the second end of the fourth blade frame and the opposite end of the base end cable being connected to the fourth blade frame generally near the first side and generally near the second end of the fourth blade frame.

10. The wind collecting apparatus of claim 2 wherein the support post cable assembly is defined further to include:
- a plurality of support post cables, each support post cable having opposite ends and one end of each support post cable being connected to the first support post generally near one end of the first support post;

a plurality of support post cables, each support post cable having opposite ends and one end of each support post cable being connected to the second support post generally near one end of the second support post; and means for anchoring the ends of the support post cables opposite the ends of the support post cables connected to the first and the second support posts.

11. The wind collecting apparatus of claim 5 wherein the first, the second, the third and the fourth blade frames are each defined further to include:

a first end post having opposite ends, one end of the first end post being connected to the shaft generally near one end of the shaft and the first end post extending generally radially from the shaft, the first end post forming the first end of the blade frames;

a second end post having opposite ends, one end of the second end post being connected to the shaft generally near the end of the shaft opposite the end of the shaft having the first end post connected thereto, the second end post extending generally radially from the shaft, the second end post forming the second end of the blade frames; and a side post having opposite ends, one end portion of the side post being connected to the end of the first end post opposite the end of the first end post connected to the shaft and the opposite end portion of the side post being connected to the end of the second end post opposite the end of the second side post connected to the shaft, the shaft forming the second side of each blade frame and the side posts forming the first side of the blade frame.

12. The wind collecting apparatus of claim 11 wherein the first, the second, the third and the fourth blade frames are each defined further to include:

a medial post having opposite ends, one end of the medial post being connected to the shaft and the opposite end of the medial post being connected to the side post at a position generally midway between the opposite ends of the side post, the medial post extending generally transversely from the shaft.

13. The wind collecting apparatus of claim 11 defined further to include:

flexible connection means for connecting the first end post and the second end post to the shaft and for connecting the side post to the first and second end posts.

14. The wind collecting apparatus of claim 11 wherein the first, the second, the third and the fourth blade frames are each defined further to include:

a plurality of blade rods, each blade rod having opposite ends with one end being connected to the shaft and the opposite end being connected to the side post, the blade rods each extending generally radially from the shaft and forming an arc extending between the shaft and the side post; and a blade connected to the first end post, the second end post, the shaft and the blade rods, the blade extending generally between the first and the second end posts and generally between the side post and the shaft.

15. The wind collecting apparatus of claim 5 defined further to include:

a pulley wheel extending circumferentially about the first, the second, the third and the fourth blade frames, the pulley wheel being connected to each of the first, the second, the third and the fourth blade frames generally near the first sides and generally between the first and second ends.

* * * * *